3,035,017
CURING AN OXIDIZED POLYDIOLEFIN WITH REACTIVE CHLORIDES
Merilyn T. Winters, Westfield, and Ober C. Slotterbeck, Rahway, N.J., assignors to Esso Research and Engineering Company, a corporation of Delaware
No Drawing. Filed Aug. 1, 1958, Ser. No. 752,400
14 Claims. (Cl. 260—47)

The present invention relates to a method for curing an oxidized polydiolefin oil. More particularly, it relates to a relatively thick film therefrom which has increased hardness.

It is well known in the art to provide a film by curing an oxidized polydiolefin oil which has been applied to a surface. In the past, however, the curing required a relatively high temperature, e.g., 350° F., for a long period of time, e.g., ½ hour. Furthermore, this procedure had another serious disadvantage since there was considerable difficulty in obtaining a very hard film with a thickness above 1.5 mils.

It has now been discovered that a film can be cured at a lower temperature within a shorter contact time. Furthermore, the hardness of a thick film can be substantially increased. This can be accomplished by incorporating a multi-functional reactive chloride in the oxidized polydiolefin oil.

Thus, in accordance with one embodiment of this invention, an air-blown polymeric oil is prepared and an organic compound, containing multi-functional reactive chlorides, is incorporated therein. The admixture therefrom is applied to a surface and is subsequently cured by air drying or by baking at relatively low temperatures.

Polymeric oils included in this invention are prepared from diolefins particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring (paramethyl styrene, dimethyl styrene, etc.), may also be used.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent (based on sodium) of an alcohol such as methanol, isopropanol, or an amyl alcohol in order to overcome the initial induction period. The resulting product may vary in viscosity from 0.15 to 20 poises. The preparation of this oil is described in U.S. Patent 2,762,951, which is incorporated herein by reference.

These polymeric oils are then oxidized by blowing them with air or oxygen, preferably in the presence of a solvent, as aromatic solvents or solvent mixtures having a Kauri Butanol value of at least 40. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octanoates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 10 to 20% oxygen in the structure.

In accordance with this invention, a multi-functional reactive chloride is mixed with the air-blown oil heretofore described. The reactive chloride of this invention is defined as an organic compound which is multi-functional since it contains two or more chlorines which will react with the OH groups in the oxidized polydiolefin oil. The preferred compounds within the purview of this invention are cyanuric chloride, glutaryl chloride, phosphonic dichloride, and tetrachloro-bisphenol-A. These compounds may be added directly to the oxidized oil or they may be dissolved in a suitable solvent, e.g., acetone, acrylonitrile, benzene, chloroform, dioxane, toluene, and nitrobenzene. It is preferred to provide a solution containing 10 to 60% of one of the reactive chloride compounds. It is also preferred to incorporate 2 to 40 parts of the resulting solution, e.g., 30%, in 100 parts of oxidized polydiolefin oil. If the compound is added directly or by solution it is preferred to provide between 1 and 40 parts by weight of the compound per 100 parts of the oxidized oil.

The admixture of the oxidized oil and the reactive chloride compound can then be applied to the surface of a material in thicknesses between 0.5 and 5.0 mils, preferably 1.5 to 2.5 mils. The surface with the admixture applied thereto can be cured by baking at a temperature between 140° and 350° F. and for 30 to 3 minutes, respectively. However, curing can also be accomplished by air drying for 12 to 48 hours.

Thus, in accordance with this invention, the end product is a hard, chemically resistant film. The thickness of the film can be above 1.5 mils and the curing can be accomplished at relatively low temperatures within a relatively short amount of time. Furthermore, the films are colorless and exhibit excellent gloss and mar resistance. These films may be useful for pipe lines, drum and tank linings, industrial finishes and furniture finishes, where all of these aforementioned characteristics are important.

The following examples are submitted to illustrate and not to limit this invention.

EXAMPLE I

A butadiene-styrene oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 Kauri-Butanol value (reference scale: Benzene–100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the non-volatile portion thereof had an average molecular weight of about 8,000.

The polymeric oil was subsequently dissolved in Solvesso 150 (high percentage of aromatics with an API gravity of 30.2, a flash point of 118° C., and a boiling range of 322° to 350° F.) to provide a 35% NVM solution. It was then blown with air at about 230° F. until the oxygen content in the structure reached 16%.

A solution was prepared comprising 20% of cyanuric chloride in a toluene solvent. Various amounts of the solvent were mixed with the above oxidized oil and the resulting admixture was applied to the surface of steel as a film in thicknesses as listed in the table below. The films were subsequently cured at a temperature of 225° F. for 15 minutes. The hardness of the cured film was then determined in accordance with plate glass as a standard with Sward Hardness value of 100.

| Parts of cyanuric chloride based on 100 parts of oxidized oil solids | Thickness (mils) | Sward Hardness |
|---|---|---|
| 1.3 | 1.5 | 42 |
| 5.4 | 2.3 | 38 |
| 9.4 | 1.8 | 46 |
| 13.5 | 1.7 | 38 |
| Control (0.0) | 1.7 | 22 |

This example demonstrates that the hardness of a film is substantially increased by incorporating cyanuric chloride in an oxidized polydiolefin oil.

EXAMPLE II

The polymeric oil of Example I was dissolved in Solvesso 150 to provide a 35% NVM solution. It was then blown with air at about 230° F. until the oxygen content in the structure reached 16%.

A solution was prepared comprising 30% of glutaryl chloride in a toluene solvent. Various amounts of the solvent were mixed with the above oxidized oil and the resulting admixture was applied to the surface of tinplate as a film in thicknesses as listed in the table below. The films were subsequently cured at a temperature of 350° F. for 3 minutes; 200° F. for 15 minutes; or air dried for 24 hours. The hardness of the cured film was then determined in accordance with Sward Hardness rocker taking plate glass as standard equals 100.

| Parts of glutaryl chloride based on 100 parts of oxidized oil solids | Cure Temperature, °F. | Thickness (mils) | Sward Hardness |
|---|---|---|---|
| 2 | 350 | 2.6 | 44 |
| 7 | 350 | 2.0 | 54 |
| 12 | 350 | 2.4 | 58 |
| 20 | 350 | 2.3 | 48 |
| Control (0.0) | 350 | 1.8 | 26 |
| 2 | 200 | 2.5 | 36 |
| 7 | 200 | 2.0 | 32 |
| 12 | 200 | 2.3 | 34 |
| 20 | 200 | 2.4 | 34 |
| Control (0.0) | 200 | 1.9 | 14 |
| 7 | air dried | 2.3 | 6 |
| Control (0.0) | do | 1.5 | 4 |

The above table indicates that the hardness of a film is increased by mixing glutaryl chloride with the oxidized polydiolefin oil before it is cured either by baking or by air drying. Furthermore, the thicknesses are 1.5 mils or above and the film is hard and chemically resistant.

EXAMPLE III

The polymeric oil of Example I was dissolved in Solvesso 150 to provide a 35% NVM solution. It was then blown with air at about 230° F. until the oxygen content in the structure reached 16%.

A solution was prepared comprising 50% of chloromethyl phosphonic dichloride in a toluene solvent. Various amounts of the solvent were mixed with the above oxidized oil and the resulting admixture was applied to the surface of tinplate as a film in thicknesses as listed in Table I. The films were subsequently cured at a temperature of 200° F. for 15 minutes or air dried for 24 hours. The hardness of the cured film was then determined in accordance with Sward Hardness rocker using plate glass as standard having value of 100. The 180° bend flexibility and chemical resistance also were measured in some instances.

The polymeric oil of Example I was blown with air to incorporate 10% oxygen in its structure. The same chloromethyl phosphonic dischloride solution was incorporated therein. The application of the film, the cure, and the tests performed were similar to the modified oil with 16% oxygen.

| Parts of Chloromethyl Phosphonic Dichloride Based on 100 Parts of Oxidized Oil Solids | Cure Temperature, °F. | Thickness (mils) | Sward Hardness |
|---|---|---|---|
| 2.1 | 200 | 1.8 | 10. |
| 9.9 | 200 | 1.6 | 12. |
| Control (0.0) | 200 | 1.6 | tacky. |
| 2.1 | air dried | 1.5 | 6. |
| 9.9 | do | 1.6 | 10. |
| Control (0.0) | do | 1.6 | tacky. |

This example shows that the hardness and chemical resistance of a film are vastly improved by incorporating chloromethyl phosphonic dichloride in an oxidized polydiolefin oil.

Table I

| Parts of Chloromethyl Phosphonic Dichloride Based on 100 Parts of Oxidized Oil Solids | Cure Temp., °F. | Thickness (mils) | Sward Hardness | Bend Flexibility | Chemical Resistance [1] | | | |
|---|---|---|---|---|---|---|---|---|
| | | | | | Water 5 hrs. | Grease 2 hrs. | Soap 2 hrs. | 1% NaOH 1 hr. |
| 1.5 | 200 | 1.6 | 32 | 1/4 | | | | |
| 3.7 | 200 | 2.0 | 26 | 1/4 | | | | |
| 6.0 | 200 | 1.7 | 34 | 1/4 | | | | |
| 9.7 | 200 | 1.6 | 28 | 1/4 | | | | |
| Control (0.0) | 200 | 1.9 | 14 | 1/4 | | | | |
| 13.5 | 200 | 1.6 | 30 | | 2 | 0 | 1 | 1 |
| 18.7 | 200 | 1.2 | 28 | | 4 | 0 | 4 | 2 |
| 1.5 | air dried | 1.5 | 10 | 1/8 | | | | |
| 6.0 | do | 1.6 | 10 | 1/8 | | | | |
| 9.7 | do | 1.5 | 8 | 1/8 | | | | |

[1] Resistance Ratings: 0 (unaffected); 1-3 (discolored); 4-6 (softened); 9 (complete failure).

EXAMPLE IV

The polymeric oil of Example I was dissolved in Solvesso 150 to provide a 35% NVM solution. It was then blown with air at about 230° F. until the oxygen content in the structure reached 16%.

A solution was prepared comprising 10% of tetrachloro-bisphenol-A in a toluene solvent. Various amounts of the solvent were mixed with the above oxidized oil and the resulting admixture was applied to the surface of steel as a film in thicknesses as listed in the table below. The films were subsequently cured at a temperature of 200° F. for 15 minutes; 250° F. for 15 minutes; or air dried for 24 hours. The hardness of the cured film was then determined in accordance with Sward Hardness rocker taking plate glass as standard with a value of 100.

| Parts of Tetrachloro-Bisphenol-A Based on 100 Parts of Oxidized Oil Solids | Cure Temperature, °F. | Thickness (mils) | Sward Hardness |
| --- | --- | --- | --- |
| 1.96 | 200 | 1.6 | 44 |
| 20.0 | 200 | 2.5 | 58 |
| Control (0.0) | 200 | 1.8 | 36 |
| 1.96 | 250 | 1.8 | 56 |
| 11.96 | 250 | 2.6 | 56 |
| 20.0 | 250 | 2.3 | 64 |
| 39.9 | 250 | 1.5 | 66 |
| Control (0.0) | 250 | 1.7 | 44 |
| 20.0 | air dried | 2.2 | 6 |
| Control (0.0) | do | 1.6 | 4 |

The polymeric oil of Example I was blown with air to incorporate 10% oxygen in its structure. The same tetrachloro-bisphenol-A solution was incorporated therein. A film was applied and cured at 275° F. for 30 minutes.

| Parts of Tetrachloro-Bisphenol-A Based on 100 Parts of Oxidized Oil Solids | Cure Temperature, °F. | Thickness (mils) | Sward Hardness |
| --- | --- | --- | --- |
| 15 | 275 | 2.0 | 30 |
| 30 | 275 | 3.3 | 20 |
| Control (0.0) | 275 | 2.5 | 12 |

The addition of tetrachloro-bisphenol-A to the oxidized oil gave harder films at thicknesses of 1.5 mils or above.

Having described the general nature and specific embodiments of the present invention, the true scope is now particularly pointed out in the appended claims.

What is claimed is:

1. A composition of matter which comprises 100 parts by weight of a liquid polymer of $C_4$ to $C_6$ conjugated diolefin which has been blown with air to incorporate oxygen in its structure in the presence of a hydrocarbon solvent having a Kauri-Butanol value of at least 40 and 1 to 40 parts of an organic compound with multi-functional reactive chlorines selected from the group consisting of cyanuric chloride, glutarylchloride, chloromethyl phosphonic dichloride, and tetrachloro-2,-bis(4-hydroxyphenyl)propane, said composition capable of being cured to provide a film with increased hardness.

2. The composition according to claim 1 in which the organic compound is cyanuric chloride.

3. The composition according to claim 1 in which the organic compound is glutaryl chloride.

4. The composition according to claim 1 in which the organic compound is chloromethyl phosphonic dichloride.

5. The composition according to claim 1 in which the organic compound is tetrachloro-bisphenol-A.

6. A process for improving the hardness of a film prepared from a liquid polymer of $C_4$ to $C_6$ conjugated diolefins which has been blown with air to incorporate oxygen in its structure, in the presence of a hydrocarbon solvent having a Kauri-Butanol value of at least 40 which comprises mixing 1 to 40 parts by weight of an organic compound with multi-functional chlorines selected from the group consisting of cyanuric chloride, glutaryl chloride, chloromethyl phosphonic dichloride, and tetrachloro-2,2-bis(4-hydroxyphenyl)propane, with 100 parts of the oxidized polymer, applying a film of said mixture to a surface and curing at a temperature between 140° and 350° F.

7. The process according to claim 6 in which the organic compound is cyanuric chlorid.

8. The process according to claim 6 in which the organic compound is glutaryl chloride.

9. The process according to claim 6 in which the organic compound is chloromethyl phosphonic dichloride.

10. The process according to claim 6 in which the organic compound is tetrachloro-bisphenol-A.

11. The composition according to claim 1 in which the polymer is selected from the group consisting of polymer of butadiene and the copolymer of butadiene with styrene.

12. A composition of matter which comprises 100 parts by weight of a liquid polymer of 75 to 85% butadiene with 25 to 15% styrene which has been blown with air to incorporate 10 to 20% oxygen in its structure in the presence of a hydrocarbon solvent having a Kauri-Butanol value of at least 40 and 1 to 40 parts of cyanuric chloride; said composition being a base-supported film with increased hardness which has been cured at a temperature between 140 and 350° F. for 30 minutes to 48 hours.

13. A process which comprises preparing a liquid polymer 75 to 85% butadiene with 15 to 25% styrene which has been air blown to incorporate 10 to 20% oxygen in its structure in the presence of a hydrocarbon solvent with a Kauri-Butanol value of at least 40; mixing 1 to 40 parts by weight of cyanuric chloride with 100 parts of said oxidized polymer; applying a film of said mixture to a surface; and curing at a temperature between room temperature and 350° F. for 3 minutes to 48 hours to provide a base-supported film therefrom with improved hardness.

14. The process according to claim 6 in which the polymer is selected from the group consisting of the homopolymer of butadiene and the copolymer of butadiene with styrene.

References Cited in the file of this patent

UNITED STATES PATENTS

| | | |
| --- | --- | --- |
| 2,145,345 | Dreyfus | Jan. 31, 1939 |
| 2,387,530 | Prichard | Oct. 23, 1945 |
| 2,495,108 | Kosolapoff | Jan. 17, 1950 |
| 2,634,256 | Sparks et al. | Apr. 7, 1953 |
| 2,660,563 | Banes et al. | Nov. 24, 1953 |
| 2,692,892 | Hillyer et al. | Oct. 26, 1954 |
| 2,734,045 | Nelson et al. | Feb. 7, 1956 |
| 2,829,135 | Greenspan et al. | Apr. 1, 1958 |
| 2,830,038 | Pattison | Apr. 8, 1958 |

OTHER REFERENCES

Bauman et al.: Journal of Polymer Science, vol. XXII, pages 203–212 (1956).